United States Patent [19]
Pollitzer

[11] 3,873,632
[45] Mar. 25, 1975

[54] ALKYLAROMATIC HYDROCARBON ISOMERIZATION PROCESS

[75] Inventor: Ernest L. Pollitzer, Skokie, Ill.

[73] Assignee: Universal Oil Products Company, Des Plaines, Ill.

[22] Filed: July 22, 1974

[21] Appl. No.: 490,425

Related U.S. Application Data

[60] Continuation-in-part of Ser. No. 319,440, Dec. 29, 1972, Pat. No. 3,849,340, which is a division of Ser. No. 197,375, Nov. 10, 1971, Pat. No. 3,763,260, which is a continuation-in-part of Ser. No. 20,125, March 16, 1970, abandoned.

[52] U.S. Cl. ................. 260/668 A, 260/683.64
[51] Int. Cl. .................................. C07c 5/24
[58] Field of Search ............. 260/668 A; 252/455 Z

[56] References Cited
UNITED STATES PATENTS

| 3,281,482 | 10/1966 | Dvoretzky et al. | 260/668 A |
| 3,377,400 | 4/1968 | Wise | 260/668 A |
| 3,578,723 | 5/1971 | Bowes et al. | 260/672 T |
| 3,649,176 | 3/1972 | Rosback | 252/455 Z |
| 3,649,177 | 3/1972 | Rosback | 252/455 Z |
| 3,755,540 | 8/1973 | Rosback | 252/455 Z |
| 3,763,260 | 10/1973 | Pollitzer | 260/672 T |
| 3,792,100 | 2/1974 | Sonoda et al. | 260/668 A |

Primary Examiner—Veronica O'Keefe
Attorney, Agent, or Firm—James R. Hoatson, Jr.; Thomas K. McBride; William H. Page, II

[57] ABSTRACT

Isomerizable alkylaromatic hydrocarbons are isomerized using a catalytic composite comprising a mordenite component having a $SiO_2/Al_2O_3$ mole ratio of at least 40:1 prepared by acid extracting $Al_2O_3$ from mordenite prepared with an initial $SiO_2/Al_2O_3$ mole ratio of about 12:1 to about 30:1 and a metal component selected from copper, silver and zirconium.

9 Claims, No Drawings

ALKYLAROMATIC HYDROCARBON ISOMERIZATION PROCESS

CROSS REFERENCE TO RELATED APPLICATIONS

This application is a continuation-in-part of my copending application Ser. No. 319,440, filed Dec. 29, 1972, now U.S. Pat. No. 3,849,340, which is, in turn, a division of my copending application Ser. No. 197,375, filed Nov. 10, 1971, now U.S. Pat. No. 3,763,260, which is, in turn, a continuation-in-part of my copending Application Ser. No. 20,125, filed Mar. 16, 1970, now abandoned, the teachings of all of which are incorporated herein by specific reference.

BACKGROUND OF THE INVENTION

This invention relates to a process for isomerizing isomerizable alkylaromatic hydrocarbons. More particularly, this invention relates to a process for isomerizing alkylaromatic hydrocarbons using a catalytic composite comprising a mordenite component and a metal component.

Mordenite is a crystalline aluminosilicate of the zeolite type which is well known to the art as an adsorption agent and as a catalytic agent in hydrocarbon conversion reactions. Mordenite, as typically manufactured or found in nature, is highly siliceous and is characterized by a silica ($SiO_2$) to alumina ($Al_2O_3$) ratio of about 10. The mordenite crystalline structure comprises four and five membered rings of $SiO_4$ and $AlO_4$ tetrahedra so arranged that the resulting crystal lattice comprises pores and channels running parallel along the crystal axis to give a tubular configuration. This structure is unique among the zeolite crystalline aluminosilicates in that the channels do not intersect and access to the cages or activities can be only one direction. For this reason, the mordenite structure is frequently referred to as two-dimensional in contrast to the other known crystalline aluminosilicates such as faujasite in which the cavities can be entered from three directions.

As stated, mordenite, as commercially available, has a $SiO_2/Al_2O_3$ mole ratio of about 10 and is usually characterized as being in the sodium form. Before the sodium form of mordenite can be utilized as an effective catalyst for hydrocarbon conversion reactions, it must be first converted to either the hydrogen form and/or substitute the alkali metal ion (typically sodium) with a catalytically active metal cation. Mordenite, since it has a high initial $SiO_2/Al_2O_3$ mole ratio and is more acid resistant than faujasite, may be converted to the hydrogen form by replacing the sodium ion with a hydrogen ion by treatment with an aqueous solution of a mineral acid. Hydrogen ion exchanged mordenites are often termed H-mordenite and are illustrated in U.S. Pat. No. 3,281,482. The catalytic activity of mordenites may also be increased by extracting a portion of the alumina from the mordenite crystal structure, as well as simultaneously ion exchanging hydrogen ions, by treatment with mineral acids under relatively severe temperatures and contact time. Produced are aluminum-deficient mordenites maintaining the same gross crystal structure in terms of gross interatomic distances as the original mordenite, as measured by x-ray diffraction patterns. Mordenites that have been so acid extracted typically have a $SiO_2/Al_2O_3$ ratio in excess of 25/1 which may extend to 100/1 or more. These acid extracted mordenites are exemplified by U.S. Pat. No. 3,480,539. Acid extracted mordenites which are particularly effective and active catalysts have $SiO_2/Al_2O_3$ ratios in excess of 50:1.

Commercially available mordenites having a $SiO_2/Al_2O_3$ ratio of about 10 which are utilized to prepare the described acid extracted mordenite are typically prepared by heating an alkali metal aluminate in solution with an alkali metal hydroxide in contact with a silica source whereby the mordenite is precipitated from the reaction mixture. For example, an aqueous solution of sodium aluminate and sodium hydroxide is heated to a temperature of about 180°–220°F. in contact with a suitable silica source such as sodium silicate, reactive amorphous silica gel, or aqueous colloidal silica sol. Crystallization occurs over a relatively short period of time, such as about 8 to 12 hours. As previously stated, the higher $SiO_2/Al_2O_3$ ratio mordenite catalysts are then prepared by the acid extraction of commercially available Na-mordenite having this initial $SiO_2/Al_2O_3$ ratio of about 10 with relatively strong mineral acids which not only physically extract alumina from the crystal structure but also replace the sodium ions with hydrogen.

Attempts to produce directly, in a single step synthesis, mordenite having an initial $SiO_2/Al_2O_3$ ratio of about 40:1 or more are generally unsuccessful in that the resultant product is an amorphous, rather than crystalline, silica-alumina composite in admixture with a mordenite of about a 10:1 $SiO_2/Al_2O_3$ ratio. However, as described in my copending application Ser. No. 20,125, it has been found that mordenite may successfully be synthesized directly in a single step procedure with a $SiO_2/Al_2O_3$ ratio greater than the 10/1 ratio presently commercially available, namely a $SiO_2/Al_2O_3$ ratio of more than 10/1 up to about 30/1. Acid extraction of this mordenite utilizing the same techniques as utilized by the art in acid extracting the commercially available mordenite with a 10:1 $SiO_2/Al_2O_3$ mole ratio also yields mordenite compositions with $SiO_2/Al_2O_3$ mole ratios in excess of 50:1. However, the acid extracted mordenites which have this increased $SiO_2/Al_2O_3$ ratio of 50:1 or more and which have prime utility as catalytic composites, when prepared from a mordenite composition having an initial 12:1-30:1 $SiO_2/Al_2O_3$ ratio have a startlingly greater activity than those mordenites prepared from a mordenite having a $SiO_2/Al_2O_3$ ratio of about 10:1, particularly when employed in alkylaromatic hydrocarbon conversion reactions. This result obtains despite the fact that the acid extracted mordenite, when prepared from either initial mordenite source, appears to have identical $SiO_2/Al_2O_3$ mole ratios and physical properties.

Processes for the isomerization of alkylaromatic hydrocarbons have acquired significant importance in the petrochemical and petroleum refining industries. The demand for paraxylene has generated a resulting demand for processes to isomerize other xylene isomers and ethylbenzene to produce para-xylene.

The performance of a given catalyst in an alkylaromatic hydrocarbon isomerization process is typically measured by the activity, selectivity, and stability of the catalyst. Activity refers to the ability of a catalyst to isomerize the alkylaromatic hydrocarbon reactants into the corresponding isomers at a specified set of reaction conditions; selectivity refers to the percent of reactants isomerized to form the desired isomerized product and- /or products; stability refers to the rate of change of the selectivity and activity of the catalyst.

The principal cause of instability (i.e., loss of selectivity and activity in an originally selective, active catalyst) is the formation of coke on the catalytic surface of the catalyst during the reaction. This coke is characterizable as a high molecular weight, hydrogen-deficient, carbonaceous material, typically having an atomic carbon to hydrogen ratio of about 1 or more. Thus, a problem in the alkylaromatic hydrocarbon isomerization art is the development of more active and selective composites not sensitive to the carbonaceous materials and/or having the ability to suppress the rate of the formation of these carbonaceous materials on the catalyst. A primary aim of the art is to develop an alkylaromatic hydrocarbon isomerization process utilizing a catalyst having superior activity, selectivity and stability. In particular, it is desired to provide a process wherein alkylaromatic hydrocarbons are isomerized without excessive cracking or other decomposition reactions which lower the overall yield of the process and make it more difficult to operate.

SUMMARY OF THE INVENTION

It is an object of this invention to provide a process for isomerizing isomerizable alkylaromatic hydrocarbons. It is another object of this invention to provide an alkylaromatic hydrocarbon isomerization process using a particular isomerization catalyst effective in isomerizing isomerizable hydrocarbons without introducing undesired side reactions and by products. It is a further object of this invention to provide a process for isomerizing isomerizable alkylaromatic hydrocarbons utilizing a catalyst having superior activity, selectivity and stability.

An alkylaromatic hydrocarbon isomerization process has now been developed utilizing a catalyst which possesses improved activity, selectivity and stability. Moreover, in the particular case of a $C_8$ alkylaromatic isomerization process, this catalyst produces essentially equilibrium conversions of the $C_8$ alkylaromatics with essentially stoichiometric selectivity without evidencing excessive production of hydrogenated or cracked products. Further, this activity and selectivity is readily maintainable at its originally high levels, thus yielding a very stable catalytic alkylaromtic isomerization process.

In broad embodiment, this invention relates to a process for isomerizing an isomerizable alkylaromatic hydrocarbon which comprises contacting said alkylaromatic hydrocarbon at isomerization conditions with a catalytic composite comprising a zeolite component of the mordenite type having a silica to alumina mole ratio of at least 40:1 prepared from an initial mordenite composition first prepared with a silica to alumina ratio of about 12:1 to about 30:1 and a metal component selected from copper, silver, gold and zirconium. Preferred in the zeolite component are final silica to alumina mole ratios of about 50:1 to about 100:1.

In a further embodiment, the zeolite component of the mordenite type, having a silica to alumina ratio of at least 40:1, is synthesized by first preparing a reaction mixture having the following, mole ratio composition:

| | |
|---|---|
| $SiO_2/Al_2O_3$ | 12–30 |
| $Na_2O/Al_2O_3$ | 1.5–2.5 |
| $H_2O/Na_2O$ | 60–200 | wherein the $SiO_2$ is employed as a cogel with the $Al_2O_3$. This reaction mixture is then maintained at a temperature of about 25°C. to about 250°C. for a time sufficient to convert substantially all of the $SiO_2$ and $Al_2O_3$ to a mordenite characterized by a $SiO_2/Al_2O_3$ mole ratio substantially as employed in the reaction mixture. The resultant mordenite is treated with an aqueous solution of an acid at a temperature of about 0°C. to about 200°C. and preferably near the normal boiling point of the acid such as about 100°C., for a time sufficient to extract at least a portion of the $Al_2O_3$ from the mordenite and to provide a mordenite composition having a $SiO_2/Al_2O_3$ mole ratio of at least 40. Preferably, $SiO_2$ component of the $SiO_2/Al_2O_3$ cogel is derived from an acidic silica solution.

I have found that the catalytic activity of mordenite prepared with a high silica to alumina mole ratio of about 12:1 to about 30:1 may be retained at a high level, while the stability of the resulting catalytic composite, when employed in an alkylaromatic hydrocarbon isomerization process, is remarkably improved, by combining this mordenite with a metal selected from copper, silver, gold and zirconium.

Other objects, embodiments and advantages of the present invention will be found in the following detailed description of the present invention.

DETAILED DESCRIPTION OF THE INVENTION

As indicated, the catalytic composition utilized in the alkylaromatic hydrocarbon isomerization process of the present invention comprises a zeolite component of the mordenite type having a silica to alumina mole ratio of at least 40:1 which is prepared by acid extracting alumina from initial mordenite composition having a silica to alumina mole ratio of about 12:1 to about 30:1 and a metal component. The $SiO_2/Al_2O_3$ mole ratio of 40:1 in the zeolite component is obtained from a mordenite composition which is initially prepared with a $SiO_2/Al_2O_3$ mole ratio of about 12:1–30:1. This is contrasted to the art which acid extracts alumina from the present, commercially available mordenites which have a $SiO_2/Al_2O_3$ mole ratio of less than 12:1 and typically about 10:1.

Mordenite with an initial silica to alumina ratio of about 12:1 to about 30:1, to be increased later by acid extraction to at least 40:1, may be formed by any suitable means. A preferred method, however, for synthesizing this particular type of mordenite comprises first preparing a reaction mixture comprising silica, alumina and aqueous sodium hydroxide having a composition defined in terms of the following mole ratios:

| | |
|---|---|
| $SiO_2/Al_2O_3$ | 12–30 |
| $Na_2O/Al_2O_3$ | 1.5–2.5 |
| $H_2O/Na_2O$ | 60–200 | the silica component being employed as a cogel with the alumina component, and maintaining this reaction mixture at a temperature of about 25° to about 300°C. Thus, the mordenite component of the catalyst of this invention is preferably prepared from an initial mordenite formed by admixing a silica-alumina cogel with an aqueous sodium hydroxide solution to form a reaction mixture of the above composition and mole ratios. Preferably, the reaction mixture comprises silica and alumina in a mole ratio of from about 12:1 to about 25:1. The reaction mixture is preferably heated to a temperature of about 150° to about 250°C., until the sodium form of mordenite precipitates therefrom. By this method, substantially all of the silica and alumina in the reaction mixture is converted to the mordenite in a relatively brief period.

In accordance with the preferred method for preparing the catalyst used in the process of this invention, the silica component of the foregoing reaction mixture is employed as a cogel with the alumina component. This results in substantially complete conversion of silica to mordenite at a considerable increase in the rate of reaction, the reaction time being reduced sometimes to as much as one-half of that time required to prepare mordenite in current processes. A convenient source of the silica-alumina cogel reactant is conventional amorphous silica-alumina cracking catalyst containing less than about 14% by weight alumina. Preferred are cracking catalysts containing less than 10% aluminum and in particular those containing about 8% by weight alumina. These amorphous catalysts are typically manufactured through a series of process steps involving the initial formation of an acidic silica sol by the acidification of an aqueous sodium silicate solution (water glass). It has also been observed that a silica-alumina cogel reactant wherein the silica has been derived from an acidic silica sol, results in a further improved rate of reaction in the formation of mordenite. As a result, such silica-alumina cogels are preferred. Subsequent steps in the manufacture of this cracking catalyst include gelation of the silica sol after which the resulting slurry is adjusted to a pH of about 3.5 and then impregnated with an aluminum sulfate solution, the aluminum sulfate being thereafter hydrolyzed and precipitated. The silicalumina product is then commonly slurried with water and spray dried to yield fine, silica-alumina micro spheres, particularly suitable as a reactant in the preparation of the afore-described mordenite.

Another suitable silica-alumina cogel reactant comprising silica is derived from an acidic silica sol such as is prepared by the well-known oil drop method. In this method, an acidic silica sol, suitably prepared by conventional methods involving the acidification of water glass is commingled with an alumina sol, suitably prepared by digesting aluminum pellets in aqueous hydrochloric acid solution, with the resulting sol blend dispersed as droplets in a hot oil bath whereby gelation occurs accompanied by the formation of spheroidal cogel particles. In this type of operation, the silica is set thermally and the alumina is set chemically by utilizing ammonia as a neutralizing agent. Usually the ammonia is furnished by an ammonia precursor, such as urea and/or hexamethylenetetramine, which is included in the alumina sol. Alternatively, the acidic silica sol is commingled with an aluminum sulfate solution which has been partially hydrolyzed with aqueous ammonia solution, and the blend dispersed in the hot oil bath as hereinbefore described. In any case, resulting silica-alumina cogel particles are usually aged in the hot oil bath and thereafter water-washed, dried and calcined.

While the silica-alumina cogel reactant may be derived from a basic silica sol, an improvement in the reaction rate is not as apparent. Such silica-alumina cogels are typically prepared by admixing an aqueous sodium silicate solution or sol with an acidic aluminum sulfate solution to form a sol blend characterized by a pH in excess of about 7. The blend is then immediately dispersed, substantially as droplets, in a hot oil bath, aged therein at an elevated temperature, water-washed, dried and calcined.

In any event, the mordenite initially prepared with a $SiO_2/Al_2O_3$ ratio in the range of 12:1–30:1 has at least a portion of the alumina removed by acid extraction methods well known to the art. This comprises treating the mordenite with relatively strong acids at temperatures from 0°C. to about 200°C. Preferred are mineral acids such as hydrochloric acid, nitric acid or sulfuric acid of at least 1N concentration. Particularly preferred is hydrochloric acid in concentration ranges of about 1N–15N and temperature ranges of about 75°C.–125°C. As is well known to those trained in the art, by varying temperature, contact times and acid concentration, the exact degree of alumina removal can be controlled. Preferred are final mordenite composites containing a $SiO_2/Al_2O_3$ ratio of about 50:1 to 100:1. In addition to extracting the alumina from the mordenite, the acid treating will also simultaneously ion exchange hydrogen ions for the cations present therein.

Other acids which are also suitable include hydrobromic, acetic, phosphoric, chloroacetic, citric, tartaric and the like but not necessarily with equivalent results. In any event, whatever acids or conditions are utilized, they are to be so chosen and manipulated to avoid decomposition of the crystalline structure of the mordenite.

The resultant alumina deficient mordenite component of the catalyst may be used as prepared or may be suspended in an inorganic oxide support or matrix such as alumina, silica, thoria, magnesia, boria, silica-alumina and the like. Similarly, the hydrogen cations present in the resultant acid extracted mordenite may be exchanged for metallic cations capable of possibly increasing the catalytic activity and/or stability of the mordenite.

The metal component of the catalyst employed in the process of the present invention comprises copper, silver, gold, or zirconium, or a combination of two or more of the foregoing metals. It is preferable that the metal component be present in the composite at about 0.01 wt.% to about 10 wt.% of the mordenite component. Good results are achieved by utilizing the metal component at about 0.1 wt.% to about 5 wt.% of the mordenite component. Of the metals noted above as suitable for use as the metal component in the composite, zirconium and silver are preferred, particularly zirconium. It has been found that these metals, when present in the composite, provide a surprising quality of stability, i.e., the composite retains a high catalytic activity under relatively mild alkylaromatic hydrocarbon isomerization conditions for a prolonged period of time, thus constituting an economical and technical improvement over previously disclosed alkylaromatic hydrocarbon isomerization catalysts. The metal component of the composite can be combined with the mordenite component in any suitable way. For example, the mordenite component may be impregnated with an aqueous solution of a salt of the metal component and dried.

The process of this invention is applicable to the isomerization of isomerizable alkylaromatic hydrocarbons of the general formula $C_6H_{(6-n)}R_n$, where $n$ is an integer from 2 to 5 and R is $CH_3$, $C_2H_5$, $C_3H_7$, or $C_4H_9$, in any combination and including all the isomers thereof. Suitable alkylaromatic hydrocarbons include, for example, ortho-xylene, meta-xylene, paraxylene, ethyltoluenes, the trimethylbenzenes, the diethylbenzenes, the triethylbenzenes, methylpropylbenzenes, ethylpropylbenzenes, the diisopropylbenzenes, the triisopropylbenzenes, etc., and mixtures thereof. Preferred isomerizable alkylaromatic hydrocarbons include the dialkylbenzenes, and trialkylbenzenes, particularly the $C_{10}$ through $C_{10}$ alkylbenzenes, and non-equilibrium mixtures of the various $C_8$–$C_{10}$ aromatic isomers, including particularly diethylbenzenes.

The isomerizable alkylaromatic hydrocarbons may be utilized as found in selective fractions from various refinery petroleum streams, e.g., as individual components or as certain boiling range fractions obtained by the selective fractionation and distillation of catalytically cracked gas oil. The process of this invention may be utilized for conversion of isomerizable aromatic hydrocarbons when they are present in minor quantities in various streams. The isomerizable aromatic hydrocarbons which may be used in the process of this invention need not be concentrated. The process of this invention allows the isomerization of alkylaromatic containing streams such as reformate to produce xylene isomers, particularly para-xylene, thus upgrading the reformate from its gasoline value to a high petrochemical value.

According to the process of the present invention, an alkylaromatic hydrocarbon charge stock, preferably in admixture with hydrogen, is contacted with a catalyst of the type thereinbefore described in an alkylaromatic hydrocarbon isomerization zone. Contacting may be effected using the catalyst in a fixed bed system, a moving bed system, a fluidized bed system, or in a batch type operation. In view of the danger of attrition loss of the valuable catalyst and of operational advantages, it is preferred to use a fixed bed system. In this system, a hydrogen-rich gas and the charge stock are preheated by suitable heating means to the desired reaction temperature and then passed into an isomerization zone containing a fixed bed of the catalyst previously characterized. The conversion zone may be one or more separate reactors with suitable means therebetween to insure that the desired isomerization temperature is maintained at the entrance to each zone. It is to be noted that the reactants may be contracted with the catalyst bed in either upward, downward, or radial flow fashion, and that the reactants may be in the liquid phase, a mixed liquid-vapor phase, or a vapor phase when contacted with the catalyst.

The process of this invention for isomerizing an isomerizable alkylaromatic hydrocarbon is preferably effected by contacting the alkylaromatic, in a reaction zone containing the hereinbefore described catalyst, with a fixed catalyst bed by passing the hydrocarbon in a down-flow fashion through the bed, while maintaining the zone at proper alkylaromatic isomerization conditions such as a temperature in the range from about 0°C. to about 600°C. or more, and a pressure of atmospheric to about 100 atmospheres or more. The hydrocarbon is passed, preferably, in admixture with hydrogen at a hydrogen to hydrocarbon mole ratio of about 0.5:1 to about 25:1 or more, and at a liquid hourly hydrocarbon space velocity of about 0.1 to about 20 hr.$^{-1}$ or more. Other inert diluents such as nitrogen, argon, etc., may be present. The isomerized product is continuously withdrawn, separated from the reactor effluent by conventional means including fractional distillation, crystallization or selective absorption and recovered.

ILLUSTRATIVE EMBODIMENTS

ILLUSTRATION I

Mordenite, having a $SiO_2/Al_2O_3$ mole ratio of about 17 was synthesized from a silica-alumina cogel reactant wherein the silica was derived from an acidic silica sol. This silica-alumina cogel reactant was prepared by acidifying 1,085 cc. of 16% sodium silicate solution (water glass) with 335 cc. of 19% hydrochloric acid to yield a silica sol with a pH of about 1.8. The silica sol was then blended with 54 cc. of an alumina sol (containing the equivalent of 17.4 grams of alumina) and 87 cc. of 28% aqueous hexamethylenetetramine solution. The resulting sol blend was spray dried. The resultant silica-alumina microspheres contained 8.1 weight percent alumina and 91.9 weight percent silica. About 470 grams of these 1/16 inch silica-alumina microspheres were admixed with 59.0 grams of sodium hydroxide in aqueous solution (1,500 cc.) and sealed in an autoclave. The autoclave was rotated and heated to a temperature of 200°C. over a 2 hour period and further rotated and heated at 100°C. for 12 hours. The reaction mixture was thereafter cooled to room temperature and filtered to recover the solids product. The product was water-washed until the washings indicated a pH of 10 and thereafter dried at 110°C. X-ray analysis indicated the product to be 100% mordenite with a $SiO_2/Al_2O_3$ mole ratio of 17.2. Similar results are obtained in preparing this type mordenite when utilizing a silica derived from a basic silica source but the reaction times are somewhat longer.

ILLUSTRATION II

The mordenite in Illustration I was acid-extracted with 2,800 cc. of 12N hydrochloric acid at a temperature of 100°C. for a period of 12 hours. This mordenite was designed as Mordenite A. In a similar fashion, commercially available Na mordenite (Norton Co., Worchester, Mass.) having a $SiO_2/Al_2O_3$ mole ratio of about 10 was acid extracted and was designed as Mordenite B. Each mordenite, A and B, had sufficient alumina removed so that each has a $SiO_2/Al_2O_3$ ratio of about 50. Both mordenites were washed with water to remove excess acid.

A sample of Mordenite A was selected and an amount of $AgNO_3$ sufficient to contain 1 weight percent Ag, based on the weight of the mordenite sample, was measured and dissolved in water. An amount of $NH_4NO_3$ sufficient to provide an ionic strength of 1 in the $AgNO_3$ solution was added thereto. The sample of Mordenite A was placed in a steam heated rotary evaporator, the Ag-containing solution was poured over it, and the sample was evaporated to dryness. The sample was then removed from the rotary evaporator, placed in a muffle furnace, and calcined at 700°C. for one hour. The calcined sample was reduced in a hydrogen atmosphere at 400°C. for 2.5 hours. The exact same procedure was followed with a sample of Mordenite B. The composite containing Mordenite A was designated Catalyst A and the conventional composite containing Mordenite B was designated Catalyst B.

ILLUSTRATION III

Catalysts A and B are compared in the fixed bed, upflow, liquid phase isomerization of a mixture of ortho-diethylbenzene and meta-diethylbenzene. In Run A, according to the process of the present invention, Catalyst A is employed in a conventional bench scale isomerization reactor. Operating conditions include a pressure of 500 psig. and 2 LHSV, with hydrogen being added to the feed to the isomerization reactor at a $H_2$/feed mole ratio of about 0.5:1. The isomerized effluent is recovered from the isomerization system and analyzed. It is found that a reactor temperature of 250°C. is required to provide a conversion of the diethylbenzene feed mixture to an essentially equilibrium mixture of the diethylbenzene isomers, including 28% para-diethylbenzene. In Run B, conventional Catalyst B is employed in the same isomerization reactor under identical conditions for purposes of comparison with Catalyst A, and the isomerized effluent is recovered and analyzed. It is found that a reactor temperature of 275°C. is required to provide the same amount of conversion as achieved by Catalyst A at an operating temperature of 250°C. When conventional Catalyst B is employed in the same system at a conversion temperature of 250°C., only 16% of p-DEB is produced. The stability of Catalyst A is compared with that of Catalyst B after both the catalysts have been utilized in the same isomerization system for equal extended periods. It is found that Catalyst A retains a high degree of isomerization activity, while after the same period of use, the activity of Catalyst B has dropped to a low level.

ILLUSTRATION IV

A sample of Mordenite A, as described in Illustration II, was selected and calcined at 700°C. for one hour. A solution of zirconium acetylacetonate in an ether-acetone mixture was prepared. The calcined sample of Mordenite A was contacted with the zirconium acetylacetonate solution and the volatile components of the solution were evaporated from the mordenite in a rotary evaporator at room temperature in a stream of air. After evaporation was complete, the zirconium-mordenite composite was reduced in a stream of hydrogen at 500°C. for two hours. The resulting composite was designated Catalyst C.

ILLUSTRATION V

Catalyst C, prepared as described in Illustration IV, is placed in the same conventional fixed bed isomerization system as employed and described in illustration III. A mixture of orthodiethylbenzene and meta-diethylbenzene is passed in liquid phase, upflow fashion through the catalyst bed at 2 LHSV. Hydrogen is added to the feed to the reactor at a $H_2$/feed mole ratio 0.5:1 0.5:1.The effluent from the isomerization reactor is recovered and analyzed. It is found that Catalyst C provides essentially equilibrium conversion of the feedstock to a mixture of the three diethylbenzene isomers, including 27% para-diethylbenzene, with a high degree of catalyst stability being observed after extended use.

ILLUSTRATION VI

A sample of Mordenite A as described in Illustration II was selected and an amount of $Cu(NO_3)_2$ to contain 1 weight percent Cu, based on the weight of the mordenite sample, was measured and dissolved in water. An amount of $NH_4NO_3$ sufficient to provide an ionic strength of 1 in the $Cu(NO_3)_2$ solution was added thereto. The mordenite sample was placed in a steam heated rotary evaporator, the $Cu(NO_3)_2$ solution was poured over it, and the sample was evaporated to dryness. The sample was then calcined at 700°C. for one hour. The calcined sample was reduced in a hydrogen atmosphere for 2.5 hours at a temperature of 400°C. The resulting composite was designated Catalyst D.

ILLUSTRATION VIII

Catalyst D, prepared as described in Illustration VI, is placed in the same conventional fixed bed isomerization system as employed and described in Illustration III. A mixture of ortho-diethylbenzene and meta-diethylbenzene is passed as a feed in liquid phase, upflow fashion, through the catalyst bed at 2 LHSV. Hydrogen is added to the feed to the reactor at a $H_2$/feed mole ration of 0.5:1. A temperature of 250°C. and a pressure of 500 psig. are maintained in the isomerization reactor. The isomerized effluent is recovered and analyzed. It is found that Catalyst D provides essentially equilibrium conversion to a mixture of the three diethylbenzene isomers, including 28% para-diethylbenzene. Excellent catalyst stability is observed when using Catalyst D over an extended period.

ILLUSTRATION VIII

Catalyst A, prepared as described in Illustrations I and II, is placed in the same, fixed bed, isomerization system as employed in Illustration III. A feed consisting of meta-xylene is passed in liquid phase, upflow fashion through the catalyst bed at 2 LHSV. Hydrogen is added to the feed to the reactor at a $H_2$/feed mole ratio of 0.5. A temperature of 350°C. and a pressure of 500 psig. are maintained in the isomerization reactor. The isomerized effluent is recovered and analyzed. It is found that Catalyst A provides essentially equilibrium conversion of the meta-xylene to a mixture of the three xylene isomers, including 20% ortho-xylene and 21% para-xylene.

ILLUSTRATION IX

Catalyst A, prepared as described in Illustration I and II, is placed in the same fixed bed isomerization system employed in the run described in Illustration III. A feed consisting of meta-diisopropylbenzene is passed in liquid phase, upflow fashion through the catalyst bed at 2 LHSV. Hydrogen is added to the feed to the isomerization reactor at a $H_2$/feed mole ratio of 0.5. A temperature of 225°C. and a pressure of 500 psig. are maintained in the isomerization reactor. The effluent from the isomerization reactor is recovered and analyzed. It is found that Catalyst A provides essentially equilibrium conversion of the meta-diisopropylbenzene to a mixture of the three diisopropylbenzene isomers, including 8% ortho-diisopropylbenzene and 35% para-diisopropylbenzene.

ILLUSTRATION X

Catalyst A, prepared as described in Illustrations I and II, is placed in the same fixed bed isomerization system employed in Illustration III. A feed consisting of meta-methylethylbenzene is passed in liquid phase, upflow fashion through the catalyst bed at 2 LHSV. Hydrogen is added to the feed to the isomerization reactor at an $H_2$/feed mole ratio of 0.5. A temperature of 250°C. and a pressure of 500 psig. are maintained in the isomerization reactor. The isomerized effluent is recovered from the isomerization reactor and analyzed. It is found that Catalyst A provides essentially equilibrium conversion of the meta-methylethylbenzene to a mixture of the three methylethylbenzene isomers, including 25% para-methylethylbenzene and 18% ortho-methylethylbenzene.

ILLUSTRATION XI

Catalyst A, prepared as described in Illustrations I and II, is placed in the same fixed bed isomerization system as employed in the run described in Illustration III. A feed consisting of 1,2,4-trimethylbenzene is passed in liquid phase, upflow fashion through the catalyst bed at 2 LHSV. Hydrogen is added to the hydrocarbon feed at a $H_2$/feed mole ratio of 0.5. A temperature of 275°C. and a pressure of 500 psig. are maintained in the isomerization reactor. The effluent from the isomerization reactor is recovered and analyzed. It is found that Catalyst A provides essentially equilibrium conversion of the 1,2,4-trimethylbenzene to a mixture of the trimethylbenzene isomers, including 26% 1,3,5-trimethylbenzene, and 9% 1,2,3,-trimethylbenzene.

ILLUSTRATION XII

Catalyst A, prepared as described in Illustrations I and II, is placed in the same fixed bed isomerization system as employed in the run described in Illustration III. A feed consisting of 1,2,3,5-tetramethylbenzene is passed in liquid phase, upflow fashion through the catalyst bed at 2 LHSV. Hydrogen is added to the feed at a $H_2$/feed mole ratio of 0.5. A temperature of 275°C. and a pressure of 500 psig. are maintained in the isomerization reactor. The effluent from the isomerization reactor is recovered and analyzed. It is found that Catalyst A provides essentially equilibrium conversion of the 1,2,3,5-tetramethylbenzene to a mixture of the tetramethylbenzene isomers, including 42% 1,2,4,5-tetramethylbenzene (durene), and 11% 1,2,3,4-tetramethylbenzene.

ILLUSTRATION XIII

Catalyst A, prepared as described in Illustrations I and II, is placed in the same fixed bed isomerization system as employed in the run described in Illustration III. A feed consisting of meta-methylisopropylbenzene is passed in liquid phase, upflow fashion through the catalyst bed at 2 LHSV. Hydrogen is added to the feed at $H_2$/mole ratio of 0.5. A temperature of 225°C. and a pressure of 500 psig. are maintained in the isomerization reactor. The effluent from the isomerization reactor is recovered and analyzed. It is found that Catalyst A provides essentially equilibrium conversion of the meta-methylisopropylbenzene to a mixture of the methylisopropylbenzene isomers, including 34% para-methylisopropylbenzene and 21% ortho-methylisopropylbenzene.

I claim as my invention:

1. A process for isomerizing an isomerizable alkylaromatic hydrocarbon which comprises contacting said isomerizable hydrocarbon with a catalyst comprising a zeolite component having a mordenite crystal structure and having a silica to alumina mole ratio of at least 40:1 prepared by acid extracting alumina from an initial mordenite composition having a silica to alumina mole ratio of about 12:1 to about 30:1 and metal component selected from the group consisting of copper, silver, gold and zirconium, at alkylaromatic isomerization conditions.

2. The process of claim 1 further characterized in that said metal component comprises about 0.01 weight percent to about 10.0 weight percent of said composition.

3. The process of claim 1 further characterized in that said zeolite component has a silica to alumina mole ratio of about 50:1 to about 100:1.

4. The process of claim 1 further characterized in that said metal component is copper and comprises about 0.1 weight percent to about 5 weight percent of said catalyst.

5. The process of claim 1 further characterized in that said metal component is silver and comprises about 0.1 weight percent to about 5 weight percent of said catalyst.

6. The process of claim 1 further characterized in that said metal component is zirconium and comprises about 0.1 weight percent to about 5 weight percent of said catalyst.

7. The process of claim 1 further characterized in that said isomerizable alkylaromatic hydrocarbon is a monocyclic aromatic hydrocarbon having two lower alkyl group substituents.

8. The process of claim 7 further characterized in that said isomerizable hydrocarbon is selected from ortho-diethylbenzene, meta-diethylbenzene and para-diethylbenzene.

9. The process of claim 7 further characterized in that said isomerizable hydrocarbon is selected from orthoxylene, meta-xylene and para-xylene.

* * * * *